United States Patent
Hien et al.

(10) Patent No.: US 11,828,643 B2
(45) Date of Patent: Nov. 28, 2023

(54) MONITORING OF COMBINATION SCALES THROUGH A 3D SENSOR

(71) Applicant: MULTIPOND Wägetechnik GmbH, Waldkraiburg (DE)

(72) Inventors: Tobias Hien, Perach (DE); Florian Hübel, Waldkraiburg (DE); Lars Schulna, Waldkraiburg (DE); Robert Wagner, Kraiburg a. Inn (DE); Wolfram C. Zeck, Mühldorf (DE)

(73) Assignee: MULTIPOND Wägetechnik GmbH, Waldkraiburg (DE)

( * ) Notice: Subject to any disclaimer, the term of this patent is extended or adjusted under 35 U.S.C. 154(b) by 178 days.

(21) Appl. No.: 17/123,160

(22) Filed: Dec. 16, 2020

(65) Prior Publication Data

US 2021/0404860 A1 Dec. 30, 2021

(30) Foreign Application Priority Data

Jun. 30, 2020 (EP) .................................... 20183104

(51) Int. Cl.
    *G01G 19/393* (2006.01)
    *G01G 11/00* (2006.01)

(52) U.S. Cl.
    CPC ......... *G01G 19/393* (2013.01); *G01G 11/003* (2013.01)

(58) Field of Classification Search
    CPC .. G01G 11/003; G01G 19/387; G01G 19/393; G01G 23/01
    See application file for complete search history.

(56) References Cited

U.S. PATENT DOCUMENTS

| 2015/0129323 | A1* | 5/2015 | Tamai | ............... G01G 19/393 177/25.18 |
| 2015/0177052 | A1 | 6/2015 | Hofer et al. | |
| 2018/0023996 | A1* | 1/2018 | Ikeda | ............... B65G 65/005 198/572 |

FOREIGN PATENT DOCUMENTS

| DE | 4230626 | 3/1994 |
| EP | 2827114 | 1/2015 |
| EP | 2887029 | 6/2015 |
| EP | 3098580 | 11/2016 |
| EP | 3101398 | 12/2016 |

* cited by examiner

*Primary Examiner* — Randy W Gibson

(57) ABSTRACT

The present invention deals with a filling device (1) and a weighing device, wherein at least one 3D sensor (2) is provided to capture at least a partial area of the transport surface, virtually dividing the detected area into a plurality of sectors (3) and zones (4). The at least one sensor (2) is adapted to determine a distance to the measuring point as well as a respective angle of incidence at which the measuring point of the detected surface is measured, The filling device (1) is adapted to make a division into sectors (3) and zones (4) dynamically as a function of at least one influencing variable (E) to derive relevant information for the regulation of the control parameters therefrom in order to achieve a controlled product distribution.

18 Claims, 15 Drawing Sheets

MONITORING OF COMBINATION SCALES THROUGH A 3D SENSOR

RELATED APPLICATION

This application claims the benefit of priority of Europe Patent Application No. 20183104.7 filed on Jun. 30, 2020, the contents of which are incorporated herein by reference in their entirety.

FIELD AND BACKGROUND OF THE INVENTION

The present application deals with an improved filling device for a combination scale with a monitoring by a 3D sensor.

In plant engineering, especially in the food industry, the handling of products is of utmost relevance, as products must be weighed and appropriately packaged before they are sold. Products are transported between and within different machines, stored in them, distributed on them, sorted, processed, weighed, etc. There are different transport devices, each of which is adapted to the product characteristics and to the specific application.

Especially in the food industry and food processing industry there is a need for additional information about the nature and distribution of products at/on certain places or areas, which is necessary for a smooth operation, and, above all, a safe operation of the plant there is often also a need to obtain additional information about the distribution of products to specific locations or areas, such as product speeds, transported volumes or similar. For this purpose, different sensors with different measuring principles are used, which for example display color, material properties and/or speed in relation to a measuring point or area. The information obtained can be used to draw conclusions about the product flow and product distribution, make certain decisions, determine data and monitor the efficiency of the process, especially in a multi-head scale and a corresponding filling device. The information about how much product of which type and at which observed point is present, is an actual state of a controlled process. Different control mechanisms can then be applied, which can react accordingly in case of deviations of the product and environmental characteristics. A controllable process can then be ensured.

Document EP 2 887 029 A1 is known from the state of the art. This document reveals a filling device for a weighing system in which at least one sensor is present on the transport surface to record and pass on product occupation information. The at least one sensor here is set up to detect at least a partial area of the transport surface, and a corresponding control device can virtually divide the area detected by a sensor into a plurality of sectors and zones. The evaluation is performed by zones and sectors, and overlapping detection areas can also be provided.

The document DE 4 230 626 A1 reveals a method for volume flow measurement of bulk materials on conveyors, especially belt conveyors. Here, a non-contact distance measurement is carried out by continuously determining the contour of the surface of the bulk material, so that a product flow can be measured.

Furthermore, the state of the art is known from the document EP 2 827 114 A1, which reveals a combination scale with cameras, whereby the occupation of products and movements of products on components of the combination scale can be recorded and evaluated by image processing, for example on a distribution plate or dosing chutes. By means of predetermined points, e.g. a corner of a dosing chute, the referencing is carried out by means of predetermined points.

Additionally known in the state of the art is the document EP 3 098 580 A1, which also shows a combination scale, on which at least two cameras are attached, which observe the dosing unit from above and downstream, in order to have a complete overview of the dosing unit.

Also known in the state of the art is the document EP 3 101 398 A1, which reveals a combination weighing device in which the status of the product flow for each of the regions is measured for a number of regions along the conveying direction, and the drive of the corresponding filling device for the combination weighing device is controlled on the basis of these measured values. However, a special alignment of the sensor or the measuring device is not revealed here.

SUMMARY OF THE INVENTION

In the state of the art, the general problem is that the products are often not homogeneous, because individual products can be granular up to coarse-grained, the shape can be irregular and physical properties can vary. For example, there may be products with varying water content or with cavities, which results in significant changes in product properties. This makes it difficult to detect the real product flow.

When distributing products for feeding of a multi-head scale, the behavior of the conveyability is also extremely unpredictable, for example, due to sticking, wedging or clumping of the individual product parts.

As a result, the even product distribution on the distribution plate and in dosing chutes of a multi-head scale can be considerably disturbed, jams can occur and, for example, products can no longer be conveyed in individual dosing chutes. As a result, local accumulations of products or gaps occur and, as already described, a dosing chute can become completely blocked or empty if a corresponding element on the distribution plate is blocked. Also the outlet of the distribution plate could be blocked by an adhering product. Such misallocations or malfunctions of parts of the multi-head scale will also disrupt the product supply on all dosing chutes, and the distribution quantity on the distribution plate can also be disrupted (if parts or partial surfaces of the distribution plate can temporarily no longer be used for conveying due to blockage). For example, the accumulation at one end of a chute can pretend a completely filled distribution plate and its refilling can be completely prevented, which would then also lead to undersupply of all other dosing channels.

The problem thereof is that the effects of such disturbances are only recognized when there is already a clear disturbance, and this is sometimes only recognized when the quantities transported and arriving in the weighing container become smaller and smaller. The control system of a multi-head scale can then attempt to change the parameters that control the product feed to counteract a product shortage. Fluctuations in the performance and inaccuracies of the scale are the result. In addition, it is possible that parts may fall off to the side if the dosing chutes are too full.

In combination scales, however, such fluctuations and inaccuracies can also make it impossible to find the right combinations, which then leads to frequent refilling, overfilling, ejections and performance drops, until the scale comes to a complete standstill.

In such a case, an error message is displayed and manual intervention is required—an operator must check all parts of the scale in which product is being conveyed and, if necessary, correct errors (e.g. clean the distribution plate or dosing chutes). The scale can then only resume normal operation after a certain time.

It is therefore an objective of the present invention to further automate and optimize the product flow on a multi-head scale and a corresponding filling device, so that a safer and more reliable operation of the scale becomes possible.

This task is solved by a filling device according to claim 1 and a method according to claim 14. Further advantageous features of the present invention are subject-matter of the dependent claims.

A filling device according to the present invention comprises a transport surface (e.g. distribution plate, dosing chutes, hoppers of a combination scale), which is supplied with products by a feeding device. Furthermore, the filling device has at least one 3D sensor for detecting and transmitting product occupation information on the transport surface, the feeding device and/or other surfaces (such as a scraper ring, a probe, a holder and/or a metal detector). The at least one sensor is adapted to detect at least a partial area of the transport surface and/or other surfaces. The control device is designed to virtually divide the surface captured by at least one sensor into a plurality of sectors in order to assign product occupation information to a sector, whereby the sector can be virtually divided into several zones.

An evaluation unit is adapted to evaluate data from the sensor.

The 3D sensor is also adapted to determine the distance to each measurement point, as well as the angle of incidence at which each measurement point that is captured is measured. Thus, an x-coordinate, a y-coordinate and an angle are measured for a measuring point. For this purpose, the axis of incidence is determined, i.e. a point at which a line, which is orthogonal to the observed surface and connects it with the sensor, has the smallest possible length. If the geometrical properties of the observed surface are known, the angle relative to this axis of incidence can be calculated for each point.

The 3D sensor can also overlook and analyze the hoppers of a combination scale.

Furthermore, the filling device is adapted to perform a division into sectors and zones also dynamically, depending on at least one influencing variable. The division into sectors and zones can be arbitrary and can be done variably according to the product allocation information and control of the plant. If not all zones and sectors are covered by one 3D sensor, several 3D sensors can be used. This can be the case, for example, if the feeding unit, which feeds the product to the distribution plate, covers some dosing chutes from the view of the 3D sensor. Thus, certain zones and sectors can be captured by several 3D sensors. Information from several 3D sensors can then be taken into account when calculating the product occupation.

The use of a 3D sensor enables obtaining not only surface information, but also depth information. This is of interest and advantage if products are not positioned directly below the sensor and the dosing chute is inclined. As the 3D sensor according to the invention can not only measure a distance to the measuring point but also an angle of incidence at which a corresponding measuring point of the surface to be detected is measured, it is possible to determine a corrected height for products or product parts which are not directly under the sensor but at a certain angle from it. This allows the evaluation unit to determine a correct product volume.

Thus, a correction of the measured occupation height at corresponding points of the measuring field according to the angle deviating from the axis of incidence and calculation of the corrected volume in corresponding sectors and zones takes place. Thus the actual volume of a product can be determined.

A dynamic division into sectors and zones further makes it possible to improve the reliability of detection, for example, finer zones and sectors can be formed in areas where the product density is greater and/or where a fault would be most critical. In this way, it is possible to create a large number of zones in those sectors where the product is moving fastest and where a higher resolution is required.

Preferably, the influencing variable is a characteristic of the transported product such as product density or external product dimensions. This makes it possible, for example, to form larger zones and/or sectors for larger product parts such as mushrooms or lettuce leaves, but to form significantly smaller zones and/or sectors for finer products such as wheat grains.

Preferably, the influencing variable can also be the vibration frequency and/or vibration amplitude of parts of the transport routes, such as the distribution plate or the dosing chutes. In areas where the vibration frequency is highest and where the products are moved fastest, a division into smaller zones and/or sectors can be performed.

In general, an automatic division into sectors and zones can also be performed according to predefined criteria, for example by recognizing the types of elements that belong together (e.g. several dosing chutes . . . ) and assigning sectors to the respective elements, then dividing them into a fixed number of zones (e.g. 10).

Zones can be divided up in different ways to cover various possibilities of non-uniform occupation, for example, transverse to the longitudinal axis over the entire width of a dosing chute or transverse to the longitudinal axis, but with separate zones to the left/right of the longitudinal axis, or zones as parts of rotationally symmetrical elements, e.g. a distribution plate (e.g. two zones in the form of a quarter circle, one zone in the form of a semicircle).

Preferably the division into zones and/or sectors can be influenced by a user.

This can be done, for example, by an input and/or display unit on the multi-function scale. For example, a 2D image of the transport surface can be selected from the display unit and divided into zones and/or the selection can be made using an external editor. By means of different stored algorithms for certain products, the division into zones and/or sectors can be stored accordingly—for example, depending on the product. The size of the zones and/or sectors is determined by the nature of the product (size, moisture content, stickiness, etc.), the shape of the products and the susceptibility of the products to clumping or jamming.

Further preferably at least one positioning mark is provided on the transport surface and the sensor is adapted to detect the at least one positioning mark. Positioning marks can, for example, be provided at the ends of the dosing chutes and in the middle of the distribution plate, and the sensor or control device can thus provide the division into zones and/or sectors on the basis of these positioning marks. It is also possible to calculate, for example, the relative position of the distribution plate and/or dosing chutes to the feeding device.

Such positioning marks can be detected automatically, so that the filling device can also detect whether all system components are correctly mounted or are present or not. If a part is mounted incorrectly, but is still functional, a correction factor can be determined, with which correct measured values can still be determined despite incorrect mounting. Alternatively, relevant points can be detected, such as the ends of the dosing chutes or the outer corners of the frames of hoppers.

Further preferably the evaluation unit is adapted to determine the product volume in at least one hopper, on the floor and walls of at least one dosing chute, on the distribution plate, on the feeding device and other parts of a combination scale.

Preferably, the evaluation unit is adapted to determine an occupation height of the individual products on the transport surface and therefrom a product volume in the individual zones and/or sectors. This creates a 2D image and a 3D image, and products can be identified using both images.

Further preferably the evaluation unit is adapted to consider a corresponding angle of the corresponding measuring point for the determination of the occupation height and the product volume in the individual zones and/or sectors. Therefore the angle is measured, which includes the axis of incidence of the sensor on the surface below and the straight line between sensor and product or a product corner.

By measuring this angle (as described above) it is possible to perform a correction of the measured occupation height according to the respective points of the measured object according to the angle deviating from the axis of incidence, and thus to determine an actual volume of the product on individual zones and/or sectors. By determining the angle, a corrected height can be determined using the laws of trigonometry and the Pythagorean theorem. From this an actual volume can be determined.

Further preferably, the product weight is also taken into account for the determination of the product volume. The product weight is determined by weighing, for example in a dosing chute, on the distribution plate or subsequently in a storage hopper or weighing hopper. It is also possible to determine the product weight in a storage hopper by measuring the moving product leaving a dosing chute in the direction of the storage hopper. For solid (i.e. non-liquid products) there are gaps, which can be relatively constant in the case of e.g. sweets, peas or jelly bears, or can vary significantly due to the irregular shape and mass of the individual pieces, e.g. being the case for chicken legs or mushrooms, or in the case of individual pieces that come to rest in different positions relative to each other, as being the case for salad leaves or chocolate bars. This leads to different cavities between the individual pieces and to a fluctuation in the average density of the bulk material. However, in order to always get a reliable statement about a product mass from one feeding element to the next (e.g. from a distribution plate to a dosing chute, from a dosing chute, into a weighing hopper, etc.), the control parameters of the feeding elements have to be adjusted according to the actual bulk density. The determination of the actual bulk density can be done for example by determining the product volume in the storage hopper and then weighing it in the weighing hopper, or the product volume can be determined on the distribution plate and a pre-scale is installed under the distribution plate to perform weighing. Thus, certain values for a product volume, as determined by the sensor, and the product mass, as determined by such a scaling device, can always be correlated with each other, and thus a mean product density can be determined, which takes the void fraction into account. Thus, more accurate values can be determined for subsequent measurements More preferably, the evaluation unit is also adapted to determine the product movement speed, preferably in individual zones and/or sectors. The sensor or the evaluation unit for example recognize a certain product area down to a single product part (e.g. by specifying the appearance of the pieces by definition like dimensions, drawing or taking pictures of samples, evaluation of the 2D/3D image and identification of single pieces or application of neural networks and adequate machine learning models like e.g. Deep Learning, Convolutional Neural Networks for the recognition of pieces by e.g. edge detection, corner detection, texture classes, object classes and estimation of the number of objects on sectors and zones) and tracks this over a certain path and calculates the product movement speed based on this information.

The product movement speed is another parameter which can be passed on to a control device, which leads to an improvement of the corresponding weighing quality.

Preferably also fluctuations in product movement and/or product properties can be detected.

Either the identification of individual objects and the measurement of their temporal progress can be carried out, for example the movement of a single praline in a dosing chute; but it is also possible to detect accumulations or gaps in products that do not occur occasionally and the measurement of their temporal progress can be carried out. For example, a product mountain of chicken legs or a product valley of sweets can be measured by image data evaluation. Also a determination of the quantity throughput (for example pieces per second) or the mass throughput (for example grams per second) or the volume throughput (for example liters per second) in observed zones and/or sectors can be performed.

The evaluation unit is further preferably adapted to detect and analyze the shapes/contours of products, the colors of products and/or the surfaces of products. Preferably, these shapes/contours of products, as well as colors of products or surface structures of products can be stored in a memory unit, whereby a comparison of the stored values and the measured values for the contours of products, colors of products as well as surface structures of products can be performed for the detection of foreign objects in the product flow.

When analyzing shapes/contours, the images of at least one sensor are checked for the presence of contours that correspond to the shape being searched for. 3D images can also be examined for a spatial shape. If the actually recognized shape matches the shape to be recognized (which is given) more than a definable minimum, the foreign object with the given shape is considered as recognized and a message is generated for this.

Products and/or foreign objects can be recognized and analyzed by comparison with stored images or image evaluation, optionally using artificial intelligence.

In the case of chunky products such as chicken legs or pralines, the recognition of the individual pieces in the measuring field of at least one 3D sensor can be performed by specifying the appearance of the pieces by definition (e.g. dimensions, drawing, recording of sample pieces), and/or by selecting the 2D and 3D image for identification of individual pieces in the case of products without overlapping as well as in the case of overlapping.

This can also be performed by specifying the appearance of the pieces by definition such as dimensions, drawing or recording of sample pieces, evaluation of the 2D/3D image and identification of individual pieces or application of neural networks and adequate machine learning models such as Deep Learning, Convolutional Neural Networks for the recognition of pieces by e.g. edge detection, corner detection, texture classes, object classes and estimation of the number of objects on sectors and zones). When detecting foreign objects of a certain color, for example, the image of the sensor can be checked for spectral content so that certain colors of different products can be filtered out, and this can be compared with typical contents of images without foreign objects. If a spectral content of the images exceeds a definable minimum level (for example, if furry small animals are present between sweets), the foreign object with the specific color is considered to be detected and a corresponding error message is displayed. If foreign objects with a certain shape are to be detected, the images are checked for the presence of the contours that correspond to the searched shape. If the detected shape has a definable minimum size, the foreign object with the specific shape is considered detected and an error message is generated. For example, contours of flies or dirt particles can be stored here, and if these do not coincide with a contour of the mushrooms, error messages can be output here. The same is possible when measuring the surface structure.

Image recognition can also be performed using artificial intelligence, where artificial neural networks are trained to distinguish different products from each other. In a learning or recognition phase different images are read in and a corresponding characteristic is assigned. Here, parameters of an artificial neural network can be trained in such a way that foreign objects can be recognized more and more reliably for a certain product.

Further preferably construction drawings of a component (for example the distribution plate, a dosing chute etc.) of the filling device can be stored in a memory, for example as 3D-pdf, as STEP-file or a digital twin. Relevant points of the captured area or measuring field can be recognized and determined, and in a real weighing situation the presence and/or the correct positioning of parts of the filling device and the combination scale can be detected automatically. If, for example, a dosing chute is missing, the sensor would detect this and output a corresponding error message. This way it can also be detected if/how individual components of the combination scale are missing or shifted, if the correct components are installed (e.g. a dosing chute could have been replaced by a wrong part after cleaning) and if upstream/downstream equipment (e.g. conveyor belts . . . ) are positioned correctly. Also assemblies of parts and optionally upstream or downstream equipment can be detected.

Further preferably the control device is adapted to control the control parameters of the filling device such as dosing times and dosing amplitudes depending on the product occupation measured by the at least one sensor. This allows the system to be operated faster and the safety of the filling device can be increased accordingly. It is also possible, for example, that a corresponding error message is output in the event of a detected error situation or that the filling device is even stopped completely.

As depicted in FIG. 13, a method according to the invention comprises at least steps (a)-(g) of the steps (a)-(j) which are described herein:
a) Using at least one 3D sensor;
b) Detection of the positioning of at least one 3D sensor relative to the filling device
c) Division of the transport area into sectors (3) and/or zones (4);

In a step d) at least one part of a filling device, for example a distribution plate, a dosing chute or a weighing hopper is analyzed with a 3D sensor when there is no product flow.

Thus, practically the data of the unoccupied plant are read in and it can be recognized later whether products or disturbing elements are detected by the sensor.

In a step e) the product flow on at least one part of the filling device is analyzed, for example on a distribution plate, a dosing chute or a weighing hopper, using the 3D sensor.

In a step f) the data measured with the 3D sensor of steps d) and e) are compared, a plausibility check of the values measured in step e) is performed.

This ensures that no disturbing elements are present and that there is an appropriate product allocation. If, for example, the data measured in steps d) and e) are the same, the system detects that, for example, no more product is moving on a dosing chute and can take appropriate measures or issue an error message.

In step g) a product distribution, volume and/or weight of the transported products is determined.

This is also performed by means of the angle correction described above.

Preferably, the method according to the present invention also comprises the following steps:
h) Assigning of information obtained in step g) to predetermined sectors and zones,
i) Calculate relevant features of the product distribution from this information, such as flow rates for mass and volume, average density, variations in product distribution such as gaps or accumulations, detection of single pieces, foreign objects, interfering edges, presence of certain features such as color, shape, surface structure, number.
j) Regulation of the control parameters based on this information for a controlled product distribution This allows the control of the whole scale to react to malfunctions etc. quickly.

Preferably, in this method, if in step d) a larger deviation is detected at certain detected points/positions within a defined, short time period Δt1, the affected points/positions in the zones and/or sectors are not used for the evaluation of step d).

In this way it can be avoided, for example, that the arm of an operator who reaches briefly into a dosing chute, causes malfunctions in the operation of the scale.

Furthermore, in step d) and/or e) deviations of the distances between sensor and individual measuring points are determined over time, and if a time span Δt1 is exceeded, an offset is calculated from this,
and if the offset does not exceed a predetermined minimum value, a correction value for the distance between the sensor and a measuring point is determined and used for subsequent measurements,
and if the offset exceeds a predetermined minimum value, corresponding measuring points are no longer considered for subsequent measurements.

Here it is also possible to differentiate between several disturbing objects:
Fixed disturbing objects, e.g. brackets, cause an offset of the zero values on the sectors/zones in which they are visible. If the minimum offset value is adjustable, they are recognized as "disturbing objects", are displayed as such and the affected points of the sectors/zones are not used for evaluations and are treated separately.

If the offset does not exceed a predetermined minimum value, a changed zero value is assumed, e.g. the dosing chutes are dirty or the distribution plate is not yet empty. A zero offset is then displayed accordingly and taken into account for subsequent measurements, or a decision must be made on how to proceed (e.g. emptying . . . ).

Short-term, only temporarily existing disturbing objects, e.g. the arm of an operator removing a product from the distribution table, are also detected immediately and, for example, ignored during their movement (and the affected points of the sectors/zones are not considered for evaluation), or if the disturbing elements maintain the same position for a predetermined time, a corresponding offset is determined.

For example, if an operator of the scale grabs the product plate with his hand and his arm is detected by the sensor, this can be done without an error message being issued because corresponding values are simply ignored.

Preferably in steps d) and e) an angle of each measuring point relative to the axis of incidence of the sensor as well as a distance is determined, and by comparing the measured distances between several measuring points, preferably product dimensions and/or empty spaces between products can be detected and determined.

BRIEF DESCRIPTION OF THE SEVERAL VIEWS OF THE INVENTION

In the following, preferred embodiments of the present invention are described in more detail by means of the attached drawings.

Figure 11A:
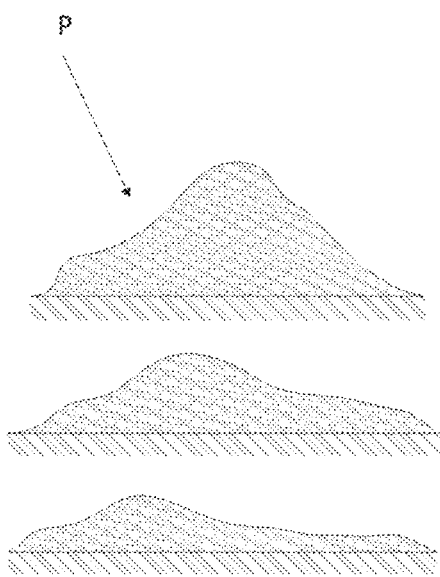
Figure 11B:
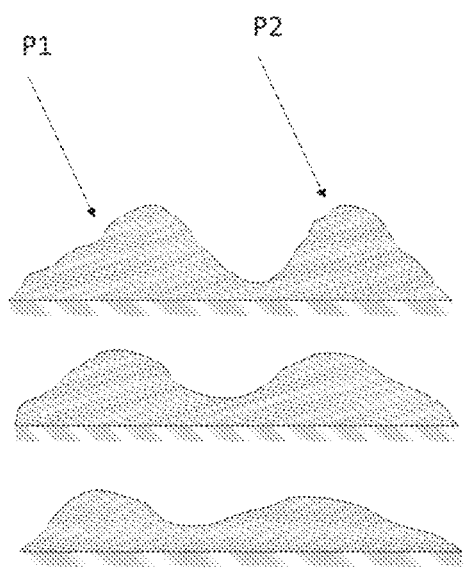

FIG. 11 a) and FIG. 11 b) show the migration of product accumulations and product valleys over time.

Figure 12A:
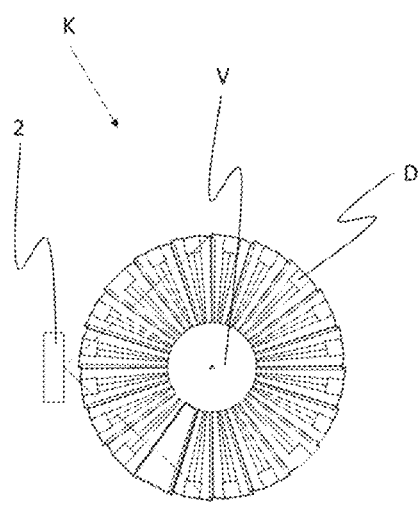
Figure 12B:
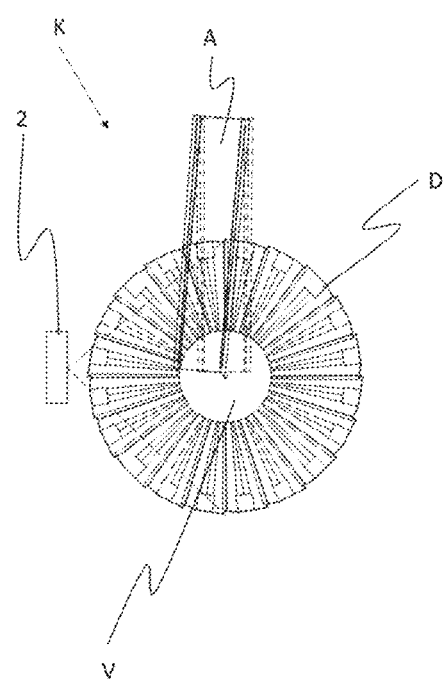

FIG. 12 shows the detection of irregularities of assemblies in a combination weighing device, wherein in FIG. 12 a) a dosing chute is missing and in FIG. 12 b) the feeding device is arranged at an angle.

Figure 13:
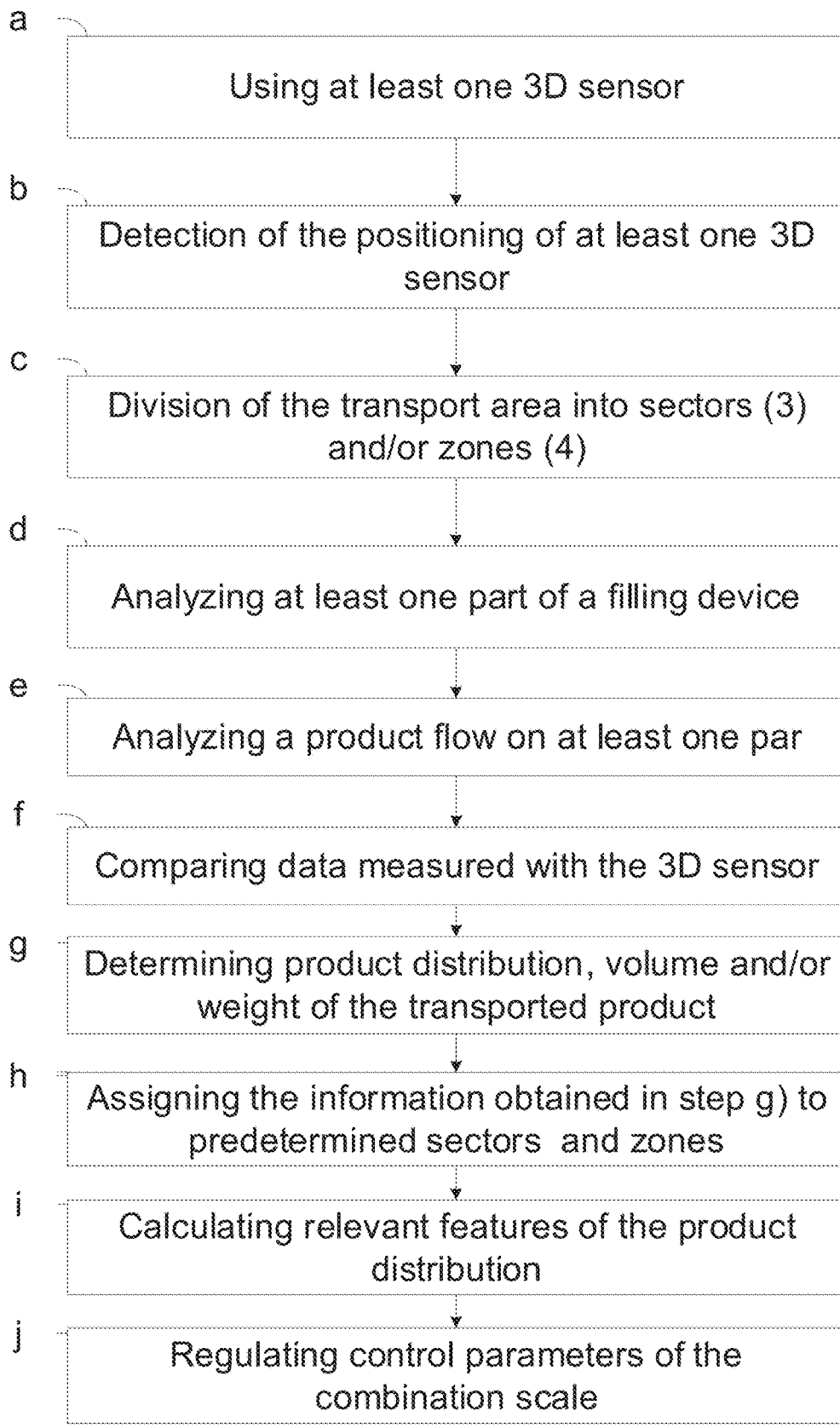

FIG. 13 is a flowchart of a method of filling a combination scale.

DESCRIPTION OF SPECIFIC EMBODIMENTS OF THE INVENTION

Figure 1:
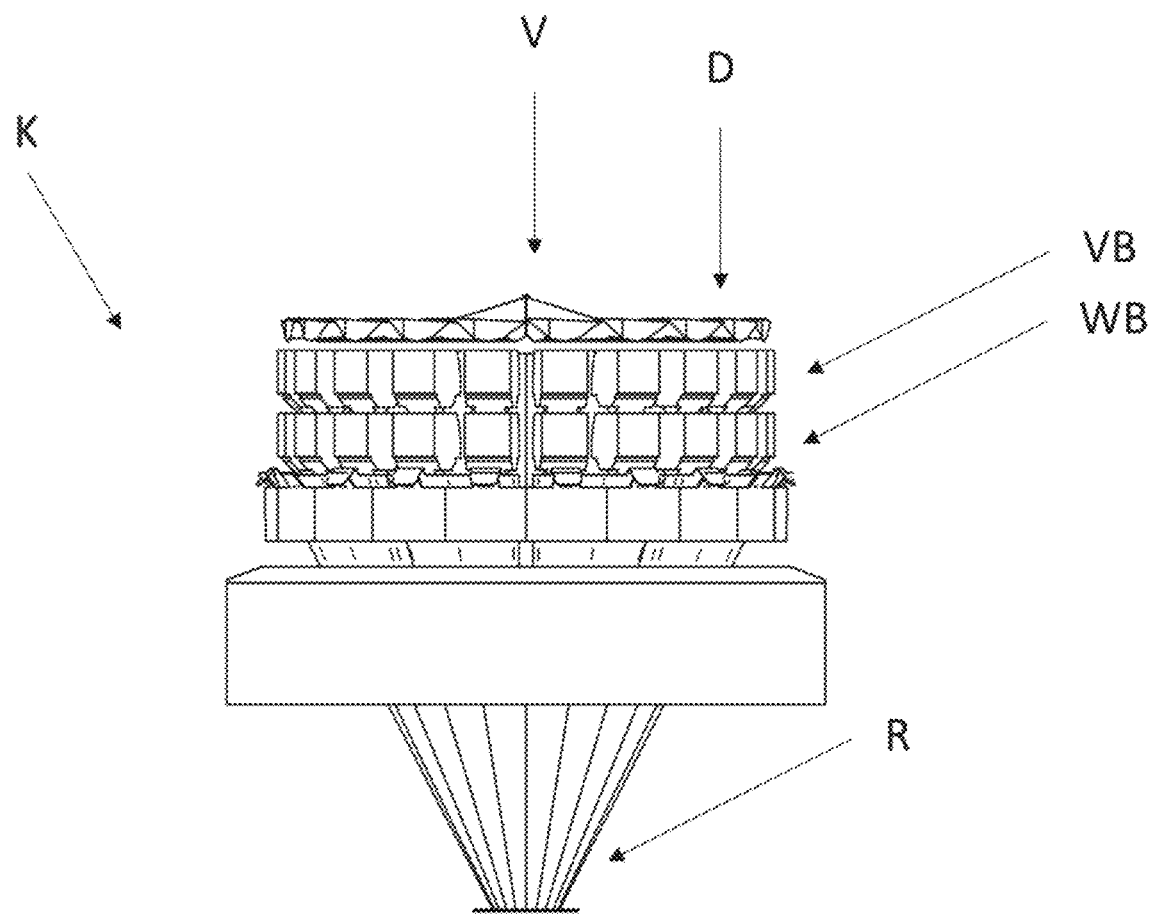
FIG. 1 shows a general view of a combination scale.

FIG. 1 shows a classical combination scale K according to the state of the art. Here a distribution plate V is present, from which products can fall onto dosing chutes D.

At the end of the dosing chutes, storage hoppers VB are arranged, below them corresponding weighing hoppers WB. These can discharge products into a chute R, from where products can enter a packaging unit.

Figure 2:
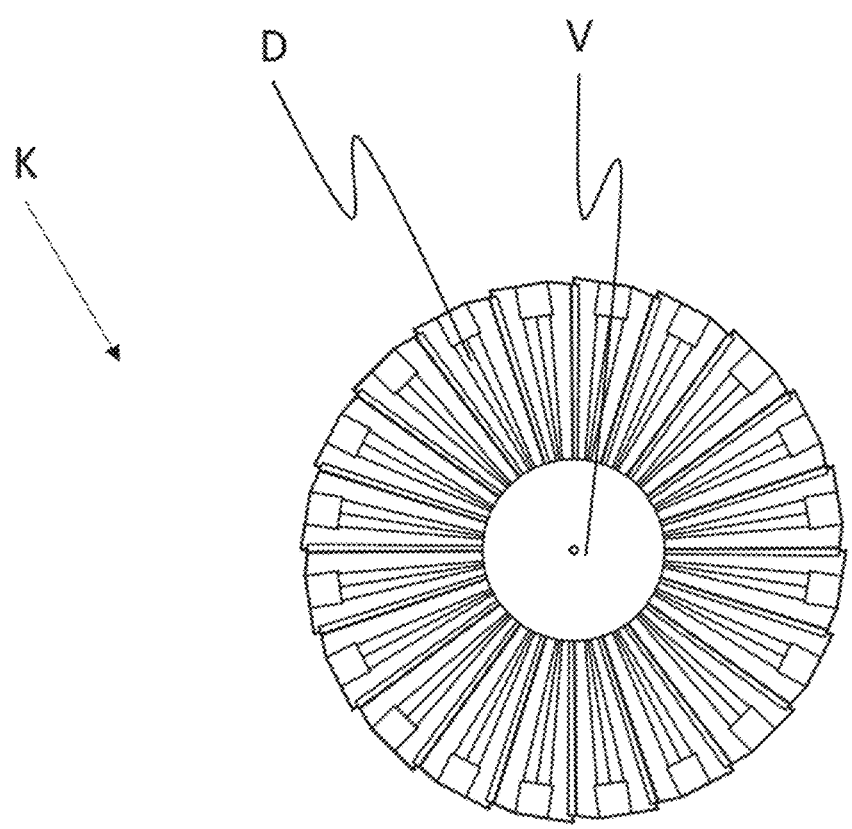
FIG. 2 shows a top view of a distribution plate and the dosing chutes of a combination scale.

FIG. 2 shows a top view of a combination scale K, whereby the distribution plate V and the arrangement of the dosing chutes D around it is shown.

Figure 3:
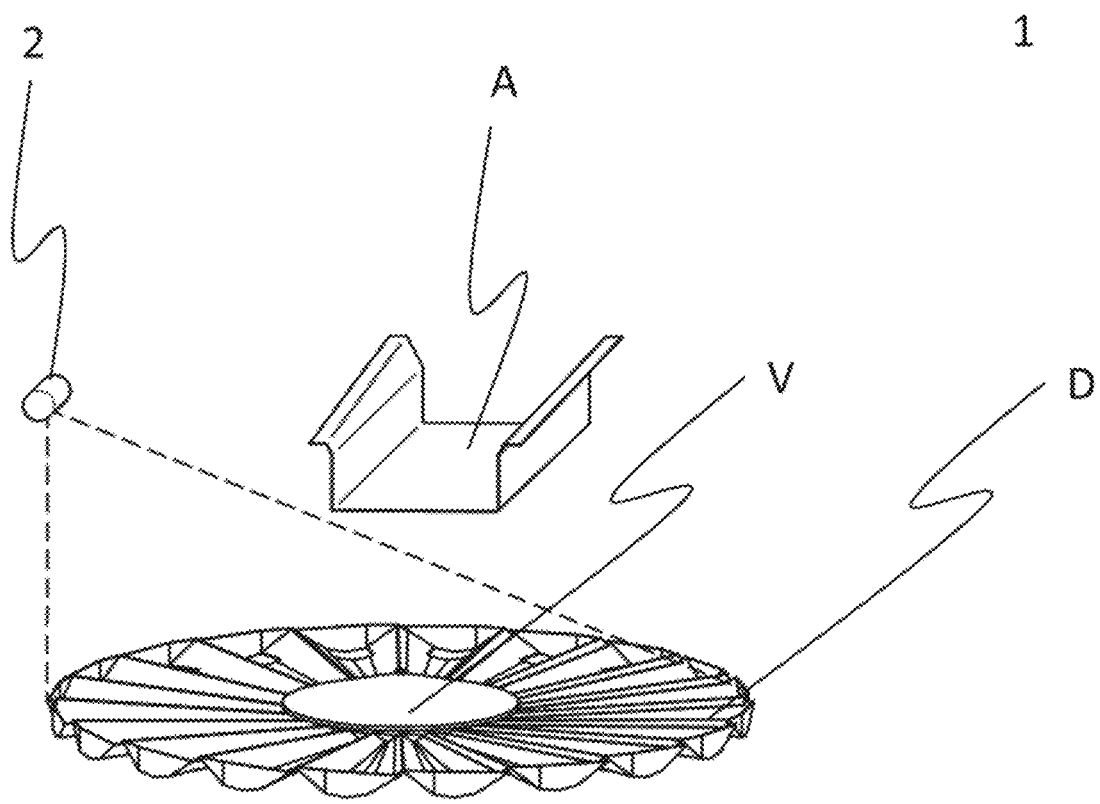
FIG. 3 shows the filling device for a combination scale with one sensor.

FIG. 3 shows a detailed view of a filling device 1, which consists of the feeding device A, the distribution plate V and the dosing chutes D. At a point outside the dosing chutes D, a sensor 2 is located, which in this case overlooks the entire distribution plate V and all dosing chutes D.

Figure 4:
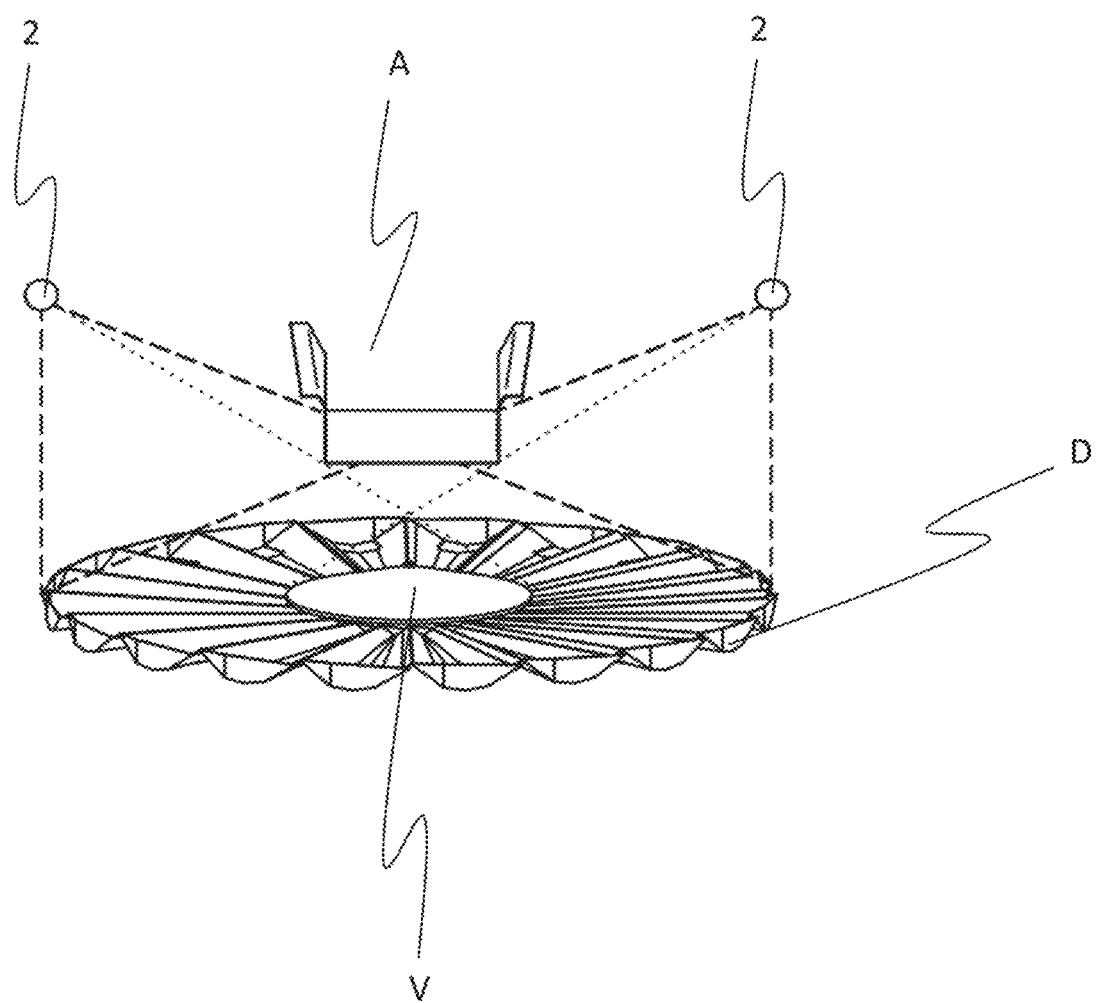
FIG. 4 shows a filling device for a combination scale with two sensors.

FIG. 4 shows a further distribution device 1, however consisting of feeding device A, dosing chutes D and distribution plate V. However, two sensors 2 are installed here, which overlook all the dosing chutes D and the distribution plate V, whereby the dosing chutes D covered by the feeding device A for one sensor 2 are detected by the other sensor.

Figure 5:
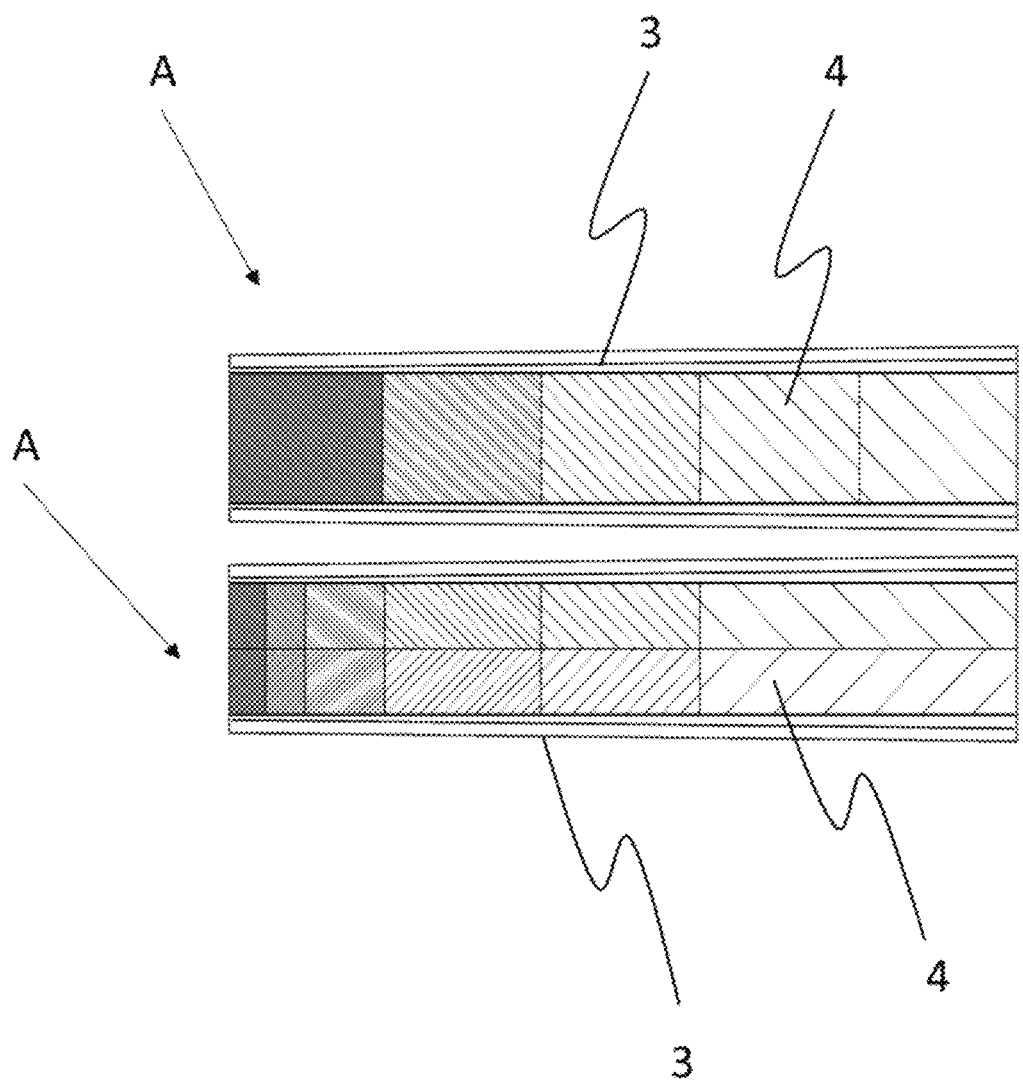
FIG. 5 shows the dividing of a feeding device into sectors and zones.

FIG. 5 shows the division of two feeding devices A into sectors 3 and zones 4 (here: two possibilities to divide a sector 3 into different zones 4). In this case, the entire feeding device A is a sector 3, and sector 3 is divided into several zones 4.

Figure 6A:
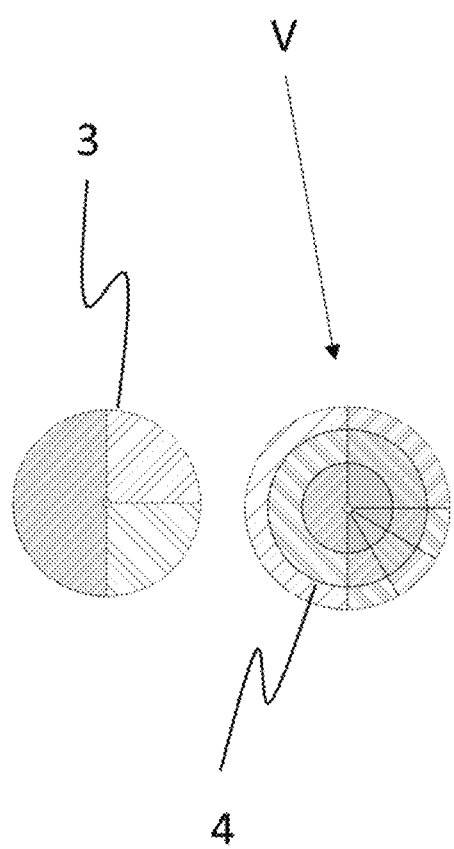
FIGS. 6a, 6b, 6c and 6d show different subdivisions of distribution plates, dosing chutes, storage hoppers and additional equipment in sectors and zones.

FIG. 6a shows a division of a distribution plate V, which is a sector 3, into several zones 4.

Figure 6B:
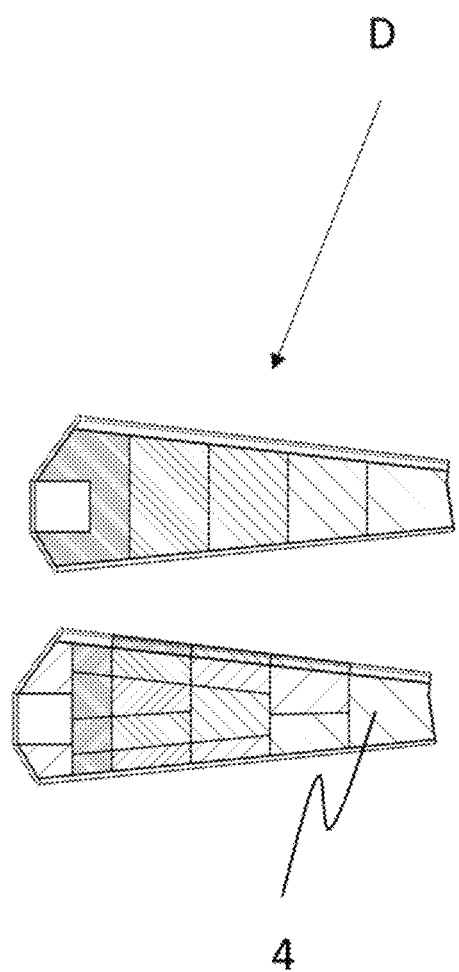
Figure 6C:
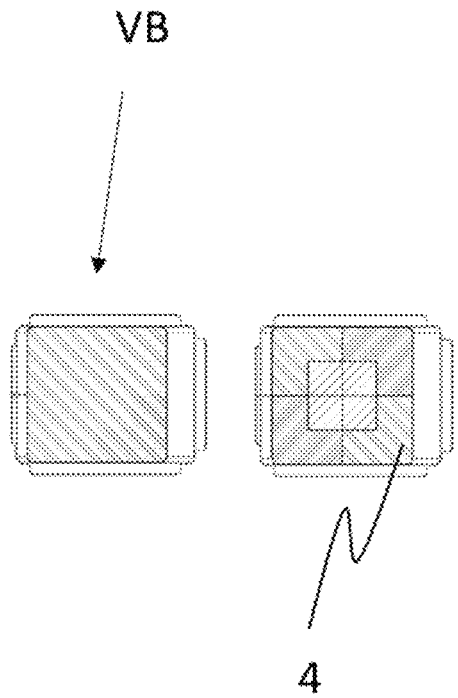
Figure 6D:
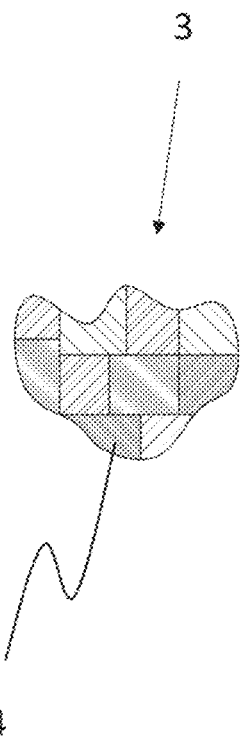

FIG. 6b shows the division of a dosing chute D, which is a sector 3, into several zones 4, and FIG. 6c shows the division of a storage hopper VB, which also represents a sector 3, into several zones 4. In FIG. 6d an additional device is shown, which represents a sector 3. This sector 3 is divided into several zones 4. The division into sectors 3 and zones 4 can be done dynamically as described above. It is therefore also possible to create sectors and/or zones outside the actual transport area of the combination scale.

Figure 7:
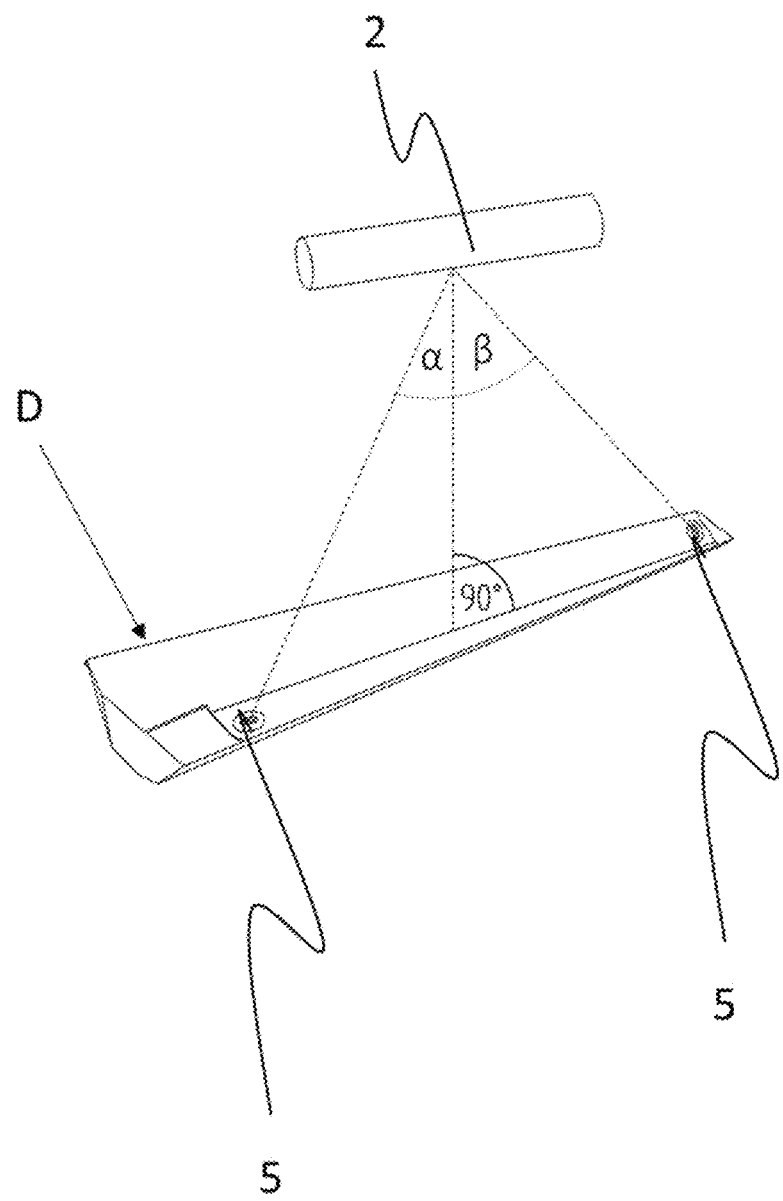
FIG. 7 shows the measurement of several points of a dosing channel with one sensor.

In FIG. 7 a sensor 2 is shown, which is located above a dosing chute D. A positioning mark 5 is located at both ends of the dosing chute D. Here, an angle $\alpha$ and $\beta$ of the individual positioning marks 5 can be measured accordingly, and thus the sensor 2 can determine whether the dosing channel D is positioned correctly. To be more precise, the angle between the connecting line from the sensor to the respective positioning mark 5 and the perpendicular from the sensor to the dosing chute is determined. The sensor can measure from one point (point sensor) or from several points—therefore it is depicted in a rod-shaped manner in FIG. 7.

Figure 8:
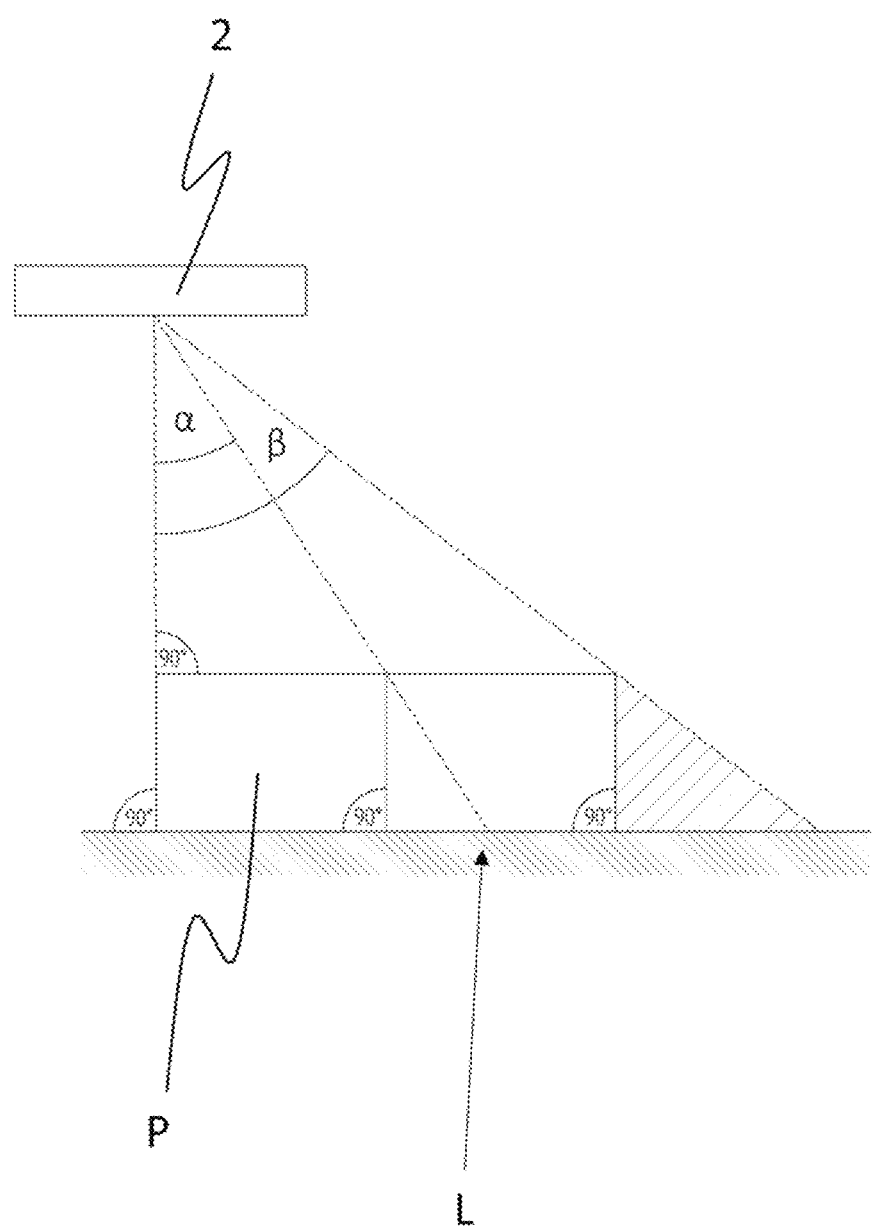
FIG. 8 shows the height calculation of a measured product.

In FIG. 8 a volume calculation with angle correction is illustrated. Here it can be seen that at least both corners of a product part P are detected by sensor 2. At the left corner shown in the figure, the sensor recognizes that this corner is positioned exactly on the axis of incidence of the sensor on the corresponding surface. The other corner is positioned at an angle $\beta$ from it. An intermediate point is also measured, which encloses an angle $\alpha$ with the axis of incidence. Thus a volume can be determined exactly, since a sensor can measure an angle and a distance at different points and can calculate the height of the product P accordingly. Here, the ground is measured without the product (here: the point under the axis of incidence and points with the angles $\alpha$ and $\beta$ to the axis of incidence), and then, if a product is lying on the transport surface, its corners are measured and the corresponding distances are corrected with the laws of trigonometry (the measured distance corresponds to the hypotenuse here, the actual distance to the adjacent leg)

It is also possible to scan a measuring field in constant angle steps and thus assign an angle to each measuring point. If in the example of FIG. 8 the angle $\beta$ is exceeded, there would be a sudden increase of the measured distance—therefore the system recognizes that the product end is present at the angle $\beta$.

For each of the measured points a height information can be determined, from which again a total volume can be calculated. The angle correction is used for the correct recording of height, volume, possible void volumes or shadow volumes with the corresponding corrections and conclusions.

Figure 9:
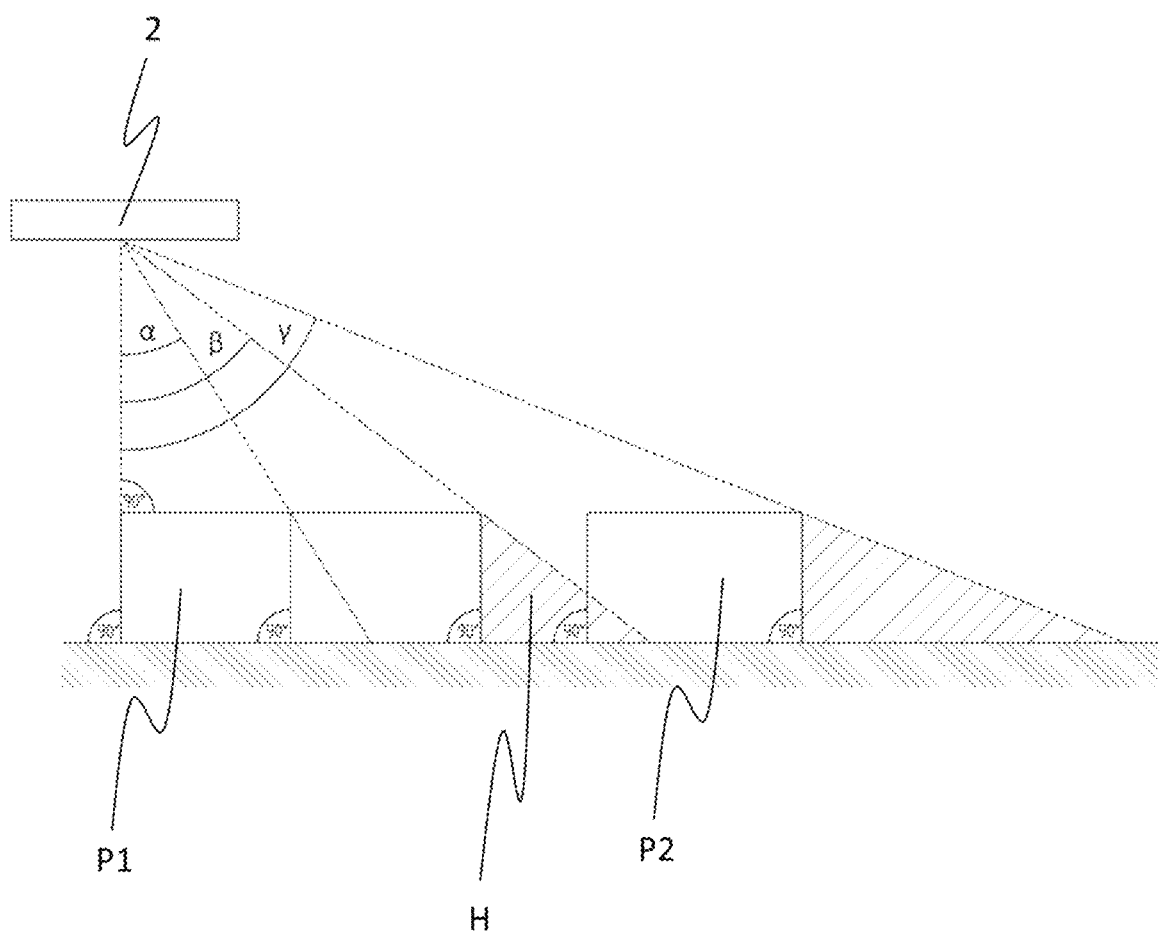
FIG. 9 shows the calculation of voids between two products using the sensor according to the invention.

In FIG. 9, sensor 2 also calculates the volume, but here for lumpy products P1 and P2. The measuring principle is similar to FIG. 8, but for product P1 two different angles α and β are measured, for product P2 a third angle γ. The individual distances and angles can be used to determine how high certain products protrude upwards, and even if they lie obliquely, an appropriate correction can be made here, so that the actual volume can be determined. Also the volume of the void space (shown here with the reference sign H) can be measured at least partially (provided that the products P1 and P2 are rectangular or have a known shape), so that a usable statement about the volume of the void space H can be obtained. For this purpose, similar to FIG. 8, the distance of the corresponding measuring point from sensor 2 is measured—and if the measured distance increases abruptly, the end of the product can be determined approximately—or if it falls abruptly, the beginning of a new product can be determined approximately.

Figure 10:
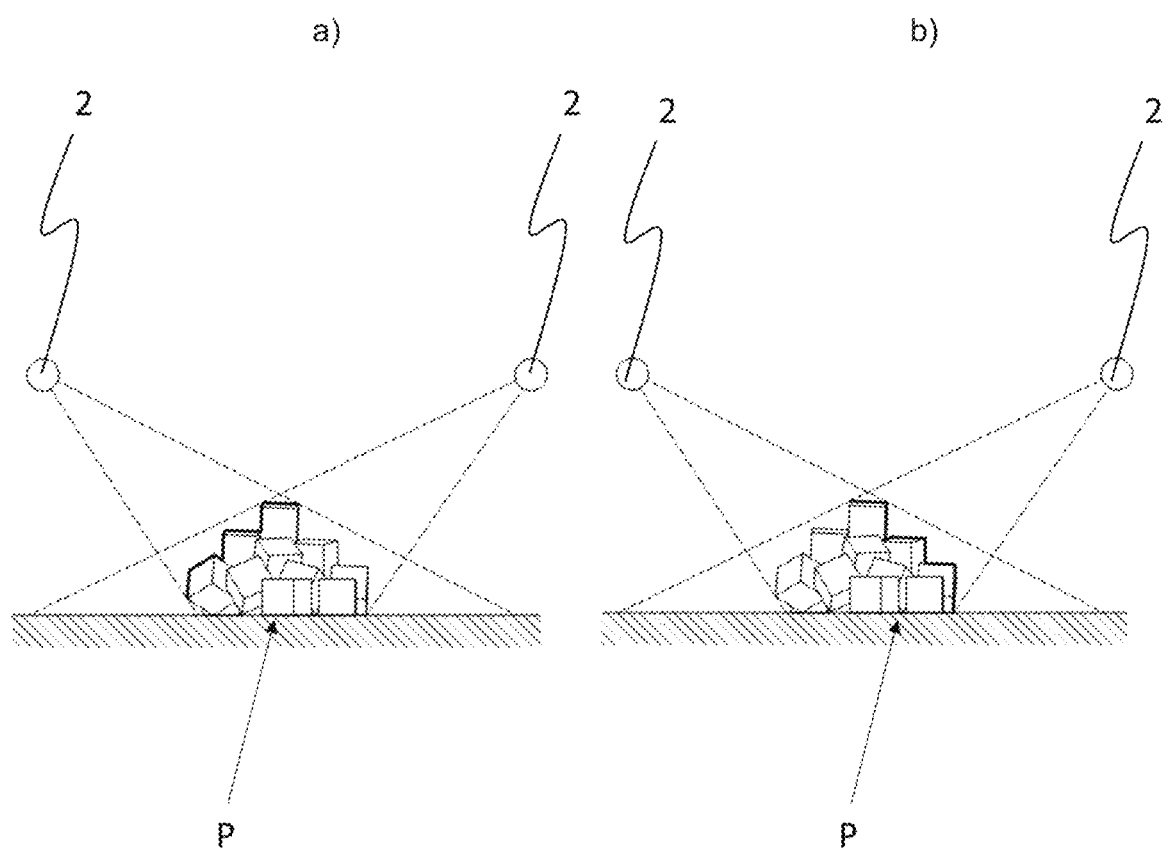
FIG. 10 shows the volume calculation for lumpy products with measurement of cavities using two sensors each.

In FIG. 10 a) and b) the volume calculation is shown for an accumulation of lumpy products. Here two sensors 2 are used, which scan the outer contours of the accumulation of products P. Here it should be tried to detect and determine the filled areas as well as the void spaces between the products as exactly as possible, at least approximately. Each of the two sensors 2 scans one side of the accumulated products P.

FIG. 11 a) shows a product accumulation of a small-sized product P, here for example grain. Here, for example, the migration speed of the highest point can be followed. Due to the vibration of the distribution plate and/or dosing chutes, the shape of the product also changes—in all views a peak or a mountain is visible, and this is moving; however, the shape of the product also changes.

In FIG. 11 b) there are two product piles P1 and P2, with a corresponding valley or depression between them. Here, by recognizing and detecting this contour, the movement or "wandering" of this valley can be followed.

FIG. 12 a) again shows a combination scale K in top view, whereby a dosing chute D is missing here. As the combination scale is captured by sensor 2, sensor 2 can detect the missing dosing chute D and output an error message.

In FIG. 12 b) a combination scale K is also shown in top view, whereby a feeding device A is present here, which however is not arranged straight as actually desired and does not run through the center of the distribution plate V, but is obliquely oriented. This can also be captured by the sensor 2 and recorded accordingly.

The present invention is not limited to the described embodiments.

More complex algorithms can be used for the calculation of void spaces and migration velocities, and much more detailed detections can be provided.

It is also not necessary to use one or two sensors, if necessary many more sensors can be used, so that the whole distribution area of the combination scale is scanned pixel by pixel.

The present invention deals with a filling device 1 and a weighing device, wherein at least one 3D sensor 2 is provided to capture at least a partial area of the transport surface, virtually dividing the detected area into a plurality of sectors 3 and zones 4. The at least one sensor 2 is adapted to determine a distance to the measuring point as well as a respective angle of incidence at which the measuring point of the detected surface is measured, The filling device 1 is adapted to make a division into sectors 3 and zones 4 dynamically as a function of at least one influencing variable E, to derive relevant information for the regulation of the control parameters therefrom in order to achieve a controlled product distribution.

What is claimed is:

1. An apparatus comprising:
a transport surface supplied with products by a feeding device,
a sensor to detect and forward product occupation information on the transport surface and/or the feeding device and/or other surfaces, wherein the sensor is adapted to detect an area of at least one of the transport surface and the feeding device, and
a control device and an evaluation unit to:
virtually divide the area detected by the sensor into a plurality of sectors in order to assign the product occupation information to one sector of the plurality of sectors;
virtually divide the sector into a plurality of zones;
determine at least one measuring point, wherein the division into sectors and zones is performed dynamically as function of at least one of:
a characteristic of the supplied products,
a vibration frequency of the supplied products, and
a vibration amplitude of the supplied products,
measure a distance to the measuring point; and
measure a respective angle of incidence under which the measuring point of the area.

2. The apparatus of claim 1, wherein the control device is adapted so that the division into sectors and zones is held based on a user selection made using a display.

3. The apparatus of claim 1, wherein at least one positioning mark is provided on the transport surface, and the sensor is adapted to detect the at least one positioning mark.

4. The apparatus of claim 1, wherein the evaluation unit is adapted to determine a product volume of a storage hopper positioned on at least one of: a dosing chute on the distribution plate on the feeding device and other parts of a combination weighing machine.

5. The apparatus of claim 1, wherein the evaluation unit is adapted to take a corresponding angle of the measuring point into account for a determination of an occupation height and a product volume.

6. The apparatus of claim 5, wherein the evaluation unit is further adapted to determine a product weight for a determination of the product volume, the product weight being determined at the transport surface or a storage hopper.

7. The apparatus of claim 1, wherein the evaluation unit is further adapted to determine a product movement speed on the transport surface in individual sectors or zones and to detect variations in product movement and/or product properties.

8. The apparatus of claim 1, wherein the evaluation unit is further adapted to detect and analyze at least one of a contour of the products, a colors of products, and a surface structures of the products.

9. The apparatus of claim 8, further comprising a memory unit configured to store the contour, the color and the surface structure, and to enable detecting a foreign objects by comparing the contours, color and surface structures, and to identify the products and/or the foreign objects with stored images or using image analysis.

10. The apparatus of claim 1, wherein a memory unit to store a dimension and a position of a component to be observed wherein the evaluation unit is adapted to detect and determine relevant points of the area, and wherein the evaluation unit is further adapted to automatically detect and determine a presence or a correct positioning of parts of a filling device, a combination scale, and an assembly of parts, upstream equipment, or downstream equipment.

11. The apparatus of claim 1, wherein the control device regulates dosing times and dosing amplitudes based on the product occupation.

12. A method of filling a combination scale, the method comprising:
  a) using at least one three-dimensional (3D) sensor;
  b) determining a positioning of the at least one 3D sensor relative to a filling device;
  c) dynamically dividing a transport area into sectors and zones based on at least one of:
    a characteristic of the supplied products,
    a vibration frequency of the supplied products, and
    a vibration amplitude of the supplied products;
  d) analyzing at least one part of the filling device with the at least one 3D sensor when there is no product flow;
  e) analyzing at least one part of the filling device with the at least one 3D sensor during product flow;
  f) comparing data measured with the at least one 3D sensor during steps d) and e) and a plausibility check of values measured in step e); and
  g) determining a product distribution, a volume and/or weight of transported products.

13. The method of claim 12, further comprising the following steps:
  h) assigning the information obtained in step g) to predetermined sectors and zones:
  i) calculating relevant features of the product distribution from the information, wherein the relevant features include at least one of: flow rates for mass and volume, average density, variations in product distribution comprising gaps or accumulations, detection of single pieces, foreign objects, interfering edges, presence of certain features comprising at least one of color, shape, surface structure, and number; and
  j) regulating control parameters of the combination scale using this information for a controlled product distribution.

14. The method of claim 12, whereby in step d) and/or e) deviations within a time span $\Delta t1$ are ignored by not using affected measuring points of corresponding sectors and/or zones in step e).

15. The method of claim 12, whereby in step d) and/or e) deviations of a distance between the 3D sensor and an individual measuring point is determined over time if a time period $\Delta t1$ is exceeded, and if an offset does not exceed a predetermined minimum value, a correction value for the distance is determined and used for subsequent measurements, and if the offset exceeds the predetermined minimum value, corresponding measuring points are no longer considered for subsequent measurements.

16. The method of claim 12, wherein in steps d) and e) an angle of each measuring point relative to the axis of incidence of the sensor as well as a distance are determined, and a corrected height of a product is determined by the evaluation unit, which allows the determination of a correct product volume, and product dimensions and/or empty spaces between products are detected and determined by comparing the measured distances between several measuring points.

17. The apparatus of claim 1, wherein the product volume is determined using a product weight of the product on the transport surface or on a storage hopper.

18. The apparatus of claim 1, where the transport area is divided into sectors and zones based on a product density or an external product dimension.

* * * * *